United States Patent

Güntherberg et al.

Patent Number: 5,760,134
Date of Patent: Jun. 2, 1998

[54] THERMOPLASTIC MOLDING MATERIALS

[75] Inventors: Norbert Güntherberg, Speyer; Konrad Knoll, Ludwigshafen; Martin Weber, Neustadt, all of Germany

[73] Assignee: BASF Aktiengesellschaft, Ludwigshafen, Germany

[21] Appl. No.: 721,539

[22] Filed: Sep. 26, 1996

[51] Int. Cl.$^6$ .................................................. C08L 51/04
[52] U.S. Cl. ....................... 525/71; 525/70; 525/902; 264/331.13
[58] Field of Search ........................... 525/64, 71, 902, 525/70; 264/331.13

[56] References Cited

U.S. PATENT DOCUMENTS

| | | | |
|---|---|---|---|
| 3,907,930 | 9/1975 | O'Grady | 525/71 |
| 4,386,125 | 5/1983 | Shiraki et al. | 525/71 X |
| 5,250,617 | 10/1993 | Piejko et al. | |
| 5,438,099 | 8/1995 | Fischer et al. | 525/71 X |
| 5,554,688 | 9/1996 | Yashima et al. | 525/71 |

FOREIGN PATENT DOCUMENTS

| | | |
|---|---|---|
| 520 813 | 12/1992 | European Pat. Off. |
| 42 11 412 | 10/1993 | Germany. |

*Primary Examiner*—Fred Teskin
*Attorney, Agent, or Firm*—Keil & Weinkauf

[57] ABSTRACT

Thermoplastic molding materials of

A) from 30 to 98% by weight of a graft polymer of $a_c$) from 30 to 90% by weight of an elastomeric graft core and $a_s$) from 10 to 70% by weight of a graft shell, B) from 1 to 50% by weight of a thermoplastic polymer, C) from 1 to 70% by weight of an elastomeric block copolymer, and D) from 0 to 30% by weight of a polymer having a star-like structure.

8 Claims, No Drawings

THERMOPLASTIC MOLDING MATERIALS

The present invention relates to thermoplastic molding materials comprising

A) from 30 to 98% by weight of a graft polymer of
  $a_c$) from 30 to 90% by weight of an elastomeric graft core obtainable by copolymerizing
    $a_c/1$) from 80 to 99.99% by weight of one or more $C_1$-$C_{10}$-alkyl esters of acrylic acid,
    $a_c/2$) from 0.01 to 20% by weight of a crosslinking monomer, and
    $a_c/3$) from 0 to 40% by weight of one or more further monomers, and
  $a_s$) from 10 to 70% by weight of a graft shell of
    $a_s/1$) from 50 to 100% by weight of a styrene compound of the formula

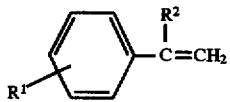

where $R^1$ and $R^2$ are each hydrogen or $C_1$-$C_8$-alkyl, and/or a $C_1$-$C_8$-alkyl ester of acrylic acid or methacrylic acid, and
    $a_s/2$) from 0 to 50% by weight of one or more further monomers, B) from 1 to 50% by weight of a thermoplastic polymer of
  $b_1$) from 50 to 100% by weight of styrene and/or α-methylstyrene,
  $b_2$) from 0 to 50% by weight of acrylonitrile, and
  $b_3$) from 0 to 50% by weight of one or more further monomers, C) from 1 to 70% by weight of an elastomeric block copolymer of at least one block A which has polymerized units of a vinylaromatic monomer and forms a hard phase
  and/or of a block B which has diene monomers and forms a first elastomeric (soft) phase
  and at least one elastomeric block B/A which has polymerized units of both a vinylaromatic monomer and a diene and forms a soft phase (if required a second or further soft phase),
  the glass transition temperature $T_g$ of block A being above 25° C. and that of block B/A being below 25° C. and the phase volume ratio of block A to block B/A being chosen so that the proportion of the hard phase in the total block copolymer is 1–40% by volume and the amount of the diene is less than 50% by weight,
and D) from 0 to 30% by weight of a polymer having a star-like structure, obtained by linking a plurality of block copolymer chains comprising
  $d_1$) from 30 to 90 % by weight of styrene and/or α-methylstyrene, and
  $d_2$) from 10 to 70% by weight of butadiene and/or isoprene
via polyfunctional molecules.

The present invention furthermore relates to those molding materials in which the component C has a specific composition, the use of these molding materials for the production of films and moldings, and films and moldings obtained from these molding materials.

Plastics films have a wide range of uses. Certain films, in particular flexible films having a leather-like appearance, are widely used in interior decoration, for example of motor vehicles, or as leather substitutes. They are generally produced by calendering or extrusion.

The main component of these films is at present generally polyvinyl chloride (PVC), which contains plasticizers and frequently also other vinyl polymers. However, the films have only limited stability to aging and moreover the plasticizers present may be exuded in the course of time.

EP-A 526 813 discloses thermoplastic molding materials comprising a highly crosslinked acrylate rubber having a graft shell of methyl methacrylate or styrene/acrylonitrile, a partly cross-linked acrylate rubber, an ethylene/vinyl acetate copolymer and, if required, a further polymer based on styrene and/or acrylic compounds. However, under the conditions for shaping, for example to films, these materials tend to undergo undesirable degradation reactions.

DE-A 42 11 412 recommends, as film material, blends of styrene/acrylonitrile polymers and thermoplastics, which have a graft shell comprising an elastomeric polymer. However, the preparation of such graft polymers requires complicated process engineering, so that it is difficult to obtain constant product qualities.

It is an object of the present invention to provide thermoplastic molding materials which can be easily prepared in constant quality and can be further processed to give moldings, especially films, without loss of quality, for example as a result of degradation reactions.

We have found that this object is achieved by the thermoplastic molding materials defined at the outset.

We have also found molding materials having specific embodiments of component C). We have furthermore found the use of the polymer blend for the production of films and moldings, and films and moldings comprising these materials.

Component A) is contained in the novel molding materials in an amount of from 30 to 98, preferably from 40 to 90, particularly preferably from 50 to 82, % by weight, based on the sum of components A), B), C) and, if required, D). This component is a particulate graft copolymer which is composed of an elastomeric graft core $a_c$) (soft component) and a shell $a_s$) grafted thereon (hard component).

The graft core $a_c$) is present in an amount of from 30 to 90, preferably from 40 to 80, in particular from 50 to 75,% by weight, based on component A).

The graft core $a_c$) is obtained by polymerizing a monomer mixture comprising, based on $a_c$),
  $a_c/1$) from 80 to 99.99, preferably from 85 to 99.5, particularly preferably from 90 to 99,% by weight of one or more $C_1$-$C_{10}$-alkyl esters of acrylic acid,
  $a_c/2$) from 0.01 to 20, preferably from 0.5 to 10, particularly preferably from 1 to 5,% by weight of a crosslinking monomer and
  $a_c/3$) from 0 to 20, preferably from 0 to 5,% by weight of one or more further monomers.

Particularly suitable alkyl acrylates $a_c/1$) are those which are derived from ethanol, from 2-ethylhexanol and in particular from n-butanol. A single alkyl acrylate or a mixture of a plurality of alkyl acrylates having different alkyl radicals may be used.

Crosslinking monomers $a_c/2$) are bi- or polyfunctional comonomers, for example butadiene and isoprene, divinyl esters of dicarboxylic acids, such as succinic acid and adipic acid, diallyl and divinyl ethers of bifunctional alcohols, for example of ethylene glycol and of butane-1,4-diol, diesters of acrylic acid and methacrylic acid with the stated bifunctional alcohols, 1,4-divinylbenzene and triallyl cyanurate.

The acrylates of tricyclodecenyl alcohol of the following formula

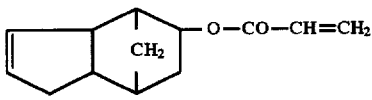

which is known by the name dihydrodicyclopentadienyl acrylate, and the allyl esters of acrylic acid and of methacrylic acid are particularly preferred.

Component $a_c$) of the molding materials may furthermore contain, at the expense of the monomers $a_c/1$) and $a_c/2$), further monomers $a_c/3$) which vary the mechanical and thermal properties of the core within a certain range. Examples of such monoethylenically unsaturated comonomers are:

vinylaromatic monomers, such as styrene, styrene derivatives of the formula I

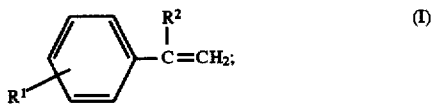

where $R^1$ and $R^2$ are each hydrogen or $C_1$-$C_8$-alkyl; methacrylonitrile, acrylonitrile;

acrylic acid, methacrylic acid and dicarboxylic acids, such as maleic acid and fumaric acid, and anhydrides thereof, such as maleic anhydride;

nitrogen-functional monomers, such as dimethylaminoethyl acrylate, diethylaminoethyl acrylate, vinylimidazole, vinyl-pyrrolidone, vinylcaprolactam, vinylcarbazole, vinylaniline and acrylamide;

$C_1$-$C_4$-alkyl esters of methacrylic acid, such as methyl methacrylate, ethyl methacrylate, n-propyl methacrylate, isopropyl methacrylate, n-butyl methacrylate, isobutyl methacrylate, sec-butyl methacrylate and tert-butyl methacrylate, and hydroxyethyl acrylate;

aromatic and araliphatic esters of acrylic acid and methacrylic acid, such as phenyl acrylate, phenyl methacrylate, benzyl acrylate, benzyl methacrylate, 2-phenylethyl acrylate, 2-phenyl- ethyl methacrylate, 2-phenoxyethyl acrylate and 2-phenoxyethyl methacrylate;

unsaturated ethers, such as vinyl methyl ether, and mixtures of these monomers.

The graft shell $a_s$) is obtained by polymerizing a monomer mixture comprising, based on $a_s$), $a_s/1$) from 50 to 100, preferably 60 to 95, particularly preferably from 65 to 85, % by weight of a styrene compound of the formula I

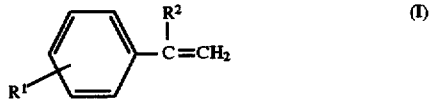

where $R^1$ and $R^2$ are each hydrogen or $C_1$-$C_8$-alkyl, and/or a $C_1$-$C_8$-alkyl ester of acrylic acid or methacrylic acid and $a_s/2$) from 0 to 50, preferably from 15 to 35, % by weight of one or more further monomers.

Styrene, α-methylstyrene and furthermore styrenes alkylated with $C_1$-$C_8$-alkyl on the nucleus, such as p-methylstyrene or tert-butylstyrene, are preferably used as a styrene compound of the formula (I) (component $a_s/1$)). Styrene is particularly preferred.

$C_1$-$C_8$-Alkyl esters of acrylic acid and/or methacrylic acid, especially those which are derived from methanol, ethanol, n-, isopropanol, sec-butanol, tert-butanol, isobutanol, pentanol, hexanol, heptanol, octanol and 2-ethylhexanol and especially from n-butanol are suitable instead of the styrene compounds or as a mixture with them. Methyl methacrylate is particularly preferred.

The shell $a_s$) may also be composed of further comonomers $a_s/2$) at the expense of the monomers $a_s/1$). The recommendations for component $a_s/2$) are the same as those for component $a_c/3$), examples of further monomers being maleic anhydride and N-substituted maleimides, such as N-methyl-, N-phenyl- and N-cyclohexylmaleimide. These and in particlar acrylonitrile are preferably used.

The graft shell $a_s$) is preferably composed of styrene or methyl methacrylate or of a mixture of from 40 to 90% by weight of methyl methacrylate and acrylonitrile as the remainder, or of a mixture of from 65 to 85% by weight of styrene and acrylonitrile as the remainder.

The graft polymers A) are obtainable in a manner known per se, preferably by emulsion polymerization at from 30° to 80° C. For example, alkali metal salts of alkanesulfonic or alkylarylsulfonic acids, alkyl sulfates, fatty alcohol sulfates, salts of higher fatty acids of 10 to 30 carbon atoms, sulfosuccinates, ether sulfonates or resin soaps are suitable as emulsifiers for this purpose. The alkali metal salts of alkanesulfonates or fatty acids of 10 to 18 carbon atoms are preferably used.

The amount of water used for the preparation of the dispersion is preferably sufficient to ensure that the prepared dispersion has a solids content of from 20 to 50% by weight.

Preferred polymerization initiators are free radical initiators, for example peroxides, preferably peroxo sulfates, and azo compounds, such as azobisisobutyronitrile. However, redox systems may also be used, in particular those based on hydroperoxides, such as cumyl hydroperoxide. Molecular weight regulators, eg. ethylhexyl thioglycolate, tert-dodecyl mercaptan, terpinols and dimeric α-methylstyrene may furthermore be present as molecular eight regulators.

In order to maintain a constant pH, which is preferably from 6 to 9, buffer substances, such as $Na_2HPO_4$/$NaH_2PO_4$ or sodium bicarbonate, may also be present.

Emulsifiers, initiators, regulators and buffer substances are used in the conventional amounts, so that more detailed information in this respect is unnecessary.

The graft core can particularly preferably also be prepared by polymerizing the monomers $a_c$) in the presence of a finely divided rubber latex (ie. seed latex polymerization procedure).

In principle, it is also possible to prepare the grafting base by a process other than that of emulsion polymerization, for example by mass or solution polymerization, and subsequently to emulsify the polymers obtained. Microsuspension polymerization is also suitable, oil-soluble initiators, such as lauroyl peroxide and tert-butyl perpivalate, preferably being used. The relevant processes are known.

The reaction conditions are preferably tailored to one another in a manner known per se so that the polymer particles have a very uniform diameter $d_{50}$ of from 60 to 1500 nm, in particular from 150 to 1000 nm. Instead of a single graft polymer A), it is also possible to use different polymers of this type, especially those having substantially different particle sizes, for the preparation of the novel thermoplastic materials. Such mixtures having a bimodal size distribution have advantages in terms of process engineering during further processing. Suitable particle diameters are from 60 to 200 nm on the one hand and from 300 to 1000 nm on the other hand.

Graft polymers having a plurality of soft and hard shells, for example having the structure $a_c)$-$a_s)$-$a_c)$-$a_s)$ or $a_s)$-$a_c)$-$a_s)$, are also suitable, especially in the case of relatively large particles.

If ungrafted polymers are formed from the monomers $a_s)$ during the grafting, these amounts, which as a rule are less than 10% by weight of $a_s)$, are assigned to the mass of component A).

Component B) of the novel molding material is present in an amount of from 1 to 50, preferably from 5 to 40, particularly preferably from 10 to 30% by weight, based on the sum of components A), B), C) and, if required, D). Component B) is a thermoplastic polymer which consists of $b_1$) from 50 to 100, preferably from 55 to 95, particularly preferably from 60 to 85,% by weight of styrene or α-methylstyrene, $b_2$) from 0 to 50, preferably from 5 to 45, particularly preferably from 15 to 40, % by weight of acrylonitrile, and $b_3$) from 0 to 50, preferably from 0 to 40, % by weight of one or more further monomers, based in each case on component B). Suitable monomers $b_3$) are those which were stated for components $a_c/3$) and $a_s/2$).

The polymers B), which are generally also referred to as SAN polymers owing to their main components styrene and acrylonitrile, are known and are also commercially available in some cases. They have, as a rule, a viscosity number VN (determined according to DIN 53 726 at 25° C. in 0.5% strength by weight solution in dimethylformamide) of from 40 to 160 ml/g, corresponding to an average molecular weight of from about 40,000 to 200,000. They are obtained in a known manner by mass, solution, suspension, precipitation or emulsion polymerization. Details of these processes are described, for example, in Kunststoff-Handbuch, editors R. Vieweg and G. Daumiller, Vol. V Polystyrol, Carl-Hanser-Verlag Munich 1969, page 118 et seq.

Polymer B) may also be a mixture of different copolymers of styrene or α-methylstyrene and acrylonitrile, which differ, for example, in the content of acrylonitrile or in the average molecular weight.

The amount, based on the sum of components A), B), C) and, if required, D), of component C) in the molding materials is from 1 to 70, preferably from 5 to 50, particularly preferably from 8 to 40, % by weight. Component C) is an elastomeric block copolymer comprising at least one block A which has polymerized units of a vinylaromatic monomer and forms a hard phase, and/or a block B which has polymerized diene monomers and forms a (first) elastomeric (soft) phase, and at least one block B/A which has polymerized units of a vinyl-aromatic monomer and of a diene and forms a soft phase, the glass transition temperature $T_g$ of block A being above 25° C. and that of block B/A being below 25° C. and the phase volume ratio of block A to block B/A being chosen so that the proportion of the hard phase in the total block copolymer is 1–40% by weight and the amount by weight of the diene is less than 50% by weight.

Detailed information on the composition and preparation of component C) is given below, and furthermore in German Laid-Open Application DOS 4,420,952, which is hereby incorporated by reference.

The soft phase (block B/A) is obtained by random copolymerization of vinylaromatic monomers and dienes in the presence of a polar cosolvent.

A block copolymer C) may be represented, for example, by one of the general formulae 1 to 11:

(1) $(A-B/A)_n$;
(2) $(A-B/A)_n-A$, preferably A–B/A–A;
(3) $B/A-(A-B/A)_n$;
(4) $X-[(A-B/A)_n]_{m+1}$;
(5) $X-[(B/A-A)_n]_{m+1}$, preferably $X-[-B/A-A]_2$;
(6) $X-[(A-B/A)_{n-A}]_{m+1}$;
(7) $X-[(B/A-A)_n-B/A]_{m+1}$;
(8) $Y-[(A-B/A)_n]_{m+1}$;
(9) $Y-[(B/A-A)_n]_{m+1}$; preferably $Y-[-B/A-A]_2$;
(10) $Y-[(A-B/A)_{n-A}]_{m+1}$;
(11) $Y-[(B/A-A)_{n-B/A}]_{m+1}$;

where A is the vinylaromatic block and B/A is the soft phase, ie. the block randomly composed of diene and vinylaromatic units, X is the radical of an n-functional initiator, Y is a radical of an m-functional coupling agent and m and n are natural numbers from 1 to 10.

A particularly preferred block copolymer is one whose soft phase is divided into blocks

(12) $(B/A)_1-(B/A)_2$;
(13) $(B/A)_1-(B/A)_2-(B/A)_1$;
(14) $(B/A)_1-(B/A)_2-(B/A)_3$;

whose vinylaromatic/diene ratio differs in the individual blocks B/A or changes continuously within a block between the limits $(B/A)_1 \rightarrow (B/A)_3$, the glass transition temperature $T_g$ of each part-block being below 25° C.

A block copolymer which has a plurality of blocks B/A and/or A having different molecular weights per molecule is likewise preferred.

A block A composed exclusively of vinylaromatic units may likewise be replaced by a block B, since all that is important overall is that an elastomeric block copolymer is formed. Such copolymers may have, for example, the structures (15) to (18)

(15) B–(B/A)
(16) (B/A)–B–(B/A)
(17) $(B/A)_1-B-(B/A)_2$
(18) $B-(B/A)_1-(B/A)_2$.

A preferred vinylaromatic compound for the purpose of the present invention is styrene, α-methylstyrene, vinyltoluene and mixtures of these compounds also being preferred. Preferred dienes are butadiene and isoprene, as well as piperylene, 1-phenylbutadiene and mixtures of these compounds.

A particularly preferred monomer combination comprises butadiene and styrene. All weights and volumes stated below are based on this combination.

The B/A block is composed of about 75–30% by weight of styrene and 25–70% by weight of butadiene. A soft block particularly preferably has a butadiene content of from 35 to 70% and a styrene content of from 65 to 30%.

The amount of diene in the total block copolymer in the case of the styrene/butadiene monomer combination is 15–65% by weight, and that of the vinylaromatic component is correspondingly 85–35% by weight. Butadiene-styrene block copolymers having a monomer composition comprising 25–60% by weight of diene and 75–40% by weight of vinylaromatic compound are particularly preferred.

The block copolymers are prepared by anionic polymerization in a nonpolar solvent with the addition of an aprotic, polar cosolvent. Preferably used solvents are aliphatic hydrocarbons, such as cyclohexane or methylcyclohexane. Particularly preferred cosolvents are ethers, for example tetrahydrofuran, and aliphatic polyethers, such as diethylene glycol dimethyl ether, and tertiary amines, eg. tributylamine and pyridine. The polar cosolvent is added to the nonpolar solvent in a small amount, for example 0.5–5% by volume. Tetrahydrofuran in an amount of 0.1–0.3% by volume is particularly preferred. Experience has shown that it is possible to manage with an amount of about 0.2% by volume in most cases.

The anionic polymerization is initiated by means of organometallic, in particular organolithium, compounds, such as methyllithium, ethyllithium, propyllithium, n-butyllithium, sec-butyllithium and tert-butyllithium. The organometallic compound is added as a solution in a chemically inert hydrocarbon, usually in an amount of from 0.002 to 5 mol%, based on the monomers.

The polymerization temperature may be from 0° to 130° C. The temperature range from 30° to 100° C. is preferred.

According to the invention, the component C) contains the soft phase composed of diene and vinylaromatic sequences in an amount of 60–95, preferably 70–90, particularly preferably 80–90, % by volume. The blocks A formed from vinylaromatic monomers constitute the hard phase, the amount of which accordingly accounts for 5–40, preferably 10–30, particularly preferably 10–20,% by volume.

The soft phase of component C) usually has a glass transition temperature of from −50° to +25° C., preferably from −50° to +5° C.

The molecular weight of block A is in general from 1000 to 200,000, preferably from 3000 to 80,000, g/mol. Within a molecule, A blocks may have different molecular weights.

The molecular weight of the block B/A is usually from 2000 to 250,000, preferably from 5000 to 150,000, g/mol. As in the case of block A, block B/A too may have different molecular weights within a molecule.

The coupling center X is formed by reacting the living anionic chain ends with a bifunctional or polyfunctional coupling agent. Examples of such compounds are given in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Dichlorodialkylsilanes, dialdehydes, such as terephthalaldehyde, and esters, such as ethyl formate or benzoate, are especially suitable for the dimerization.

Random block B/A may in turn be subdivided into blocks B1/A1–B2/A2–B3/A3– . . . Preferably, the random block consists of from 2 to 15, particularly preferably from 3 to 10, random part-blocks.

The polymerization is carried out in a plurality of stages and, in the case of monofunctional initiation, is started, for example, with the preparation of the hard block A. A part of the monomer is initially taken in the reactor and the polymerization is initiated by adding the initiator. In order to achieve a defined chain structure, it is advisable, but not essential, to carry out the process to a high conversion (more than 99%) before the second monomer addition is carried out.

The sequence of the monomer addition depends on the block structure chosen. In the case of monofunctional initiation, for example, the vinylaromatic compound is either initially taken or directly metered in. Diene and vinylaromatic compound should then be added as far as possible simultaneously. The random structure and the composition of block B/A is determined by the ratio of diene to vinylaromatic compound, the concentration and chemical structure of the Lewis base and the temperature. According to the invention, the amount of diene is from 25 to 70% by weight, relative to the total weight including vinylaromatic compounds. Block A may then be polymerized on by adding the vinylaromatic compound. Instead, required polymer blocks may also be linked to one another by the coupling reaction. In the case of bifunctional initiation, the B/A block is first synthesized, followed by the A block.

The further working up is effected by the conventional methods. It is advisable to carry it out in a stirred kettle and to stop the polymerization by means of an alcohol, such as isopropanol, to slightly acidify the mixture in a conventional manner with $CO_2$/water before the further working up, to stabilize the polymer with an oxidation inhibitor and a free radical acceptor (commercial products, such as tris-nonylphenyl phosphite (TNPP) or α-to-copherol (vitamin E) or products available under the trade name Irganox 1076 or Irganox 3052) to remove the solvent by the conventional methods and to carry out extrusion and granulation.

Component D) of the novel molding materials is present in an amount of from 0 to 30, preferably from 0 to 15, in particular from 1 to 10,% by weight, based on the sum of the components.

Component D) is a polymer which has a star-like structure and is obtained by linking a plurality of monomer chains via oligofunctional molecules. The polymer chains consist of a block copolymer and are therefore referred to here as block copolymer chains, said block copolymer being composed essentially of $d_1$) from 30 to 90% by weight of styrene and/or α-methylstyrene, and $d_2$) from 10 to 70% by weight of butadiene and/or isoprene.

The block copolymer chains are preferably prepared by the method of anionic polymerization in solution, initiators mainly suitable bing organometallic compounds, such as sec-butyllithium. Polymers which are essentially straight-chain are obtained.

As a rule, block copolymers in which one chain end is formed by a block comprising styrene and/or α-methylstyrene and in which the other chain end is formed by a block comprising butadiene and/or isoprene are preferred. These blocks may be separated from one another by random polymers, and furthermore the blocks may also contain minor amounts of units of the respective other monomers.

Particularly preferred among the possible block copolymers are two-block copolymers, ie. those of the type: block comprising styrene and/or α-methylstyrene—block comprising butadiene and/or isoprene, and three-block copolymers, ie. those of the type: block comprising styrene and/or α-methylstyrene—block comprising butadiene and/or isoprene—block comprising styrene and/or α-methylstyrene.

Mixtures of block copolymers which differ in their molecular weights by from 20,000 to 100,000 units are particularly preferred.

A particularly preferred block copolymer D) has a structure: block comprising styrene—block comprising styrene and butadiene, whose beginning is butadiene-rich and whose end is styrene-rich—block comprising styrene. The middle block is also referred to as a tapered transition from butadiene to styrene.

Oligofunctional monomers which are suitable for linking the block copolymer chains are, for example, polyepoxides, eg. epoxidized linseed oil, polyisocyanates, such as 1,2,4-triisocyanatobenzene, polyketones, such as 1,3,6-hexanetrione and polyanhydrides, as well as dicarboxylic esters, such as diethyl adipate, and silicone halides, such as $SiCl_4$, metal halides, such as $TiCl_4$ and, polyvinylaromatics, such as divinylbenzenes.

In the case of the two-block copolymers, the blocks comprising styrene and/or α-methylstyrene generally point outward after linking. Linking is carried out via living chain ends on butadienyllithiun or styryllithium.

Suitable solvents for the polymerization are anhydrous liquids, such as alkanes and cycloaliphatic and aromatic hydrocarbons. Cyclohexane is preferably used.

The anionic polymerization is preferably carried out at from −20° to 150° C.

The reaction is terminated in a manner known per se by adding a polar compound, such as water or an alcohol.

Working up to obtain the desired polymers, whose molecular weight $M_w$, is preferably brought to 50,000–300,000, in particular 100,000–220,000, is carried out in the usual manner.

More details on the preparation of the polymers having a star-like structure appear in German Laid-Open application DOS 2,610,068.

In addition to the star-like polymers, component D) may also contain linear block copolymers without a star structure. These linear block copolymers contain, as a rule, 3 to 8 blocks and may have tapered block transitions.

The star-like and linear block copolymers described are commercial products and are available, for example, under the names Finaclear® (Fina Chemicals), K-Resin® (Phillips Petroleum), Clearen® (Denka) and Styrolux® (BASF).

In addition to the components A), B), C) and D), the thermoplastic molding materials may also contain additives, such as lubricants and mold release agents, pigments, dyes, flameproofing agents, antioxidants, light stabilizers, fibrous and pulverulent fillers and reinforcing agents and antistatic agents in the amounts customary for these agents. Particularly in the production of films from the novel molding materials, plasticizers are concomitantly used, for example copolymers having an average molecular weight of from 2000 to 8000 and comprising from 30 to 70% by weight of ethylene oxide and from 70 to 30% by weight of 1,2-propylene oxide, in amounts of from 0.5 to 10% by weight, based on the sum of the components A), B), C) and, if required, D).

The novel molding materials can be prepared by a mixing method known per se, for example with melting in an extruder, Branbury mixer, kneader, roll mill or calender. However, the components may also be mixed at room temperature without melting, and the powder mixture or mixture consisting of granules then melted and homogenized during processing.

Moldings of all kinds, in particular films, can be produced from the molding materials. The films can be produced by extrusion, rolling, calendering and other methods known to a person skilled in the art. The novel molding materials are formed into a processable film by heating and/or friction alone or with the concomitant use of plasticizing and other additives. The processing of such films to finished products is carried out, for example, by thermoforming or deep drawing.

The films have a wide range of potential uses, in particular in the automotive industry for interior design, for decorative purposes, as a leather substitute in the production of valises and bags and in the furniture industry as covering material for the lamination of furniture surfaces.

The novel thermoplastic molding materials contain no halogen. They are very substantially free of volatilizing or exuding components and exhibit virtually no disadvantageous changes as a result of degradation reactions, for example discolorations, during processing. Furthermore, they have good mechanical properties.

EXAMPLES

The following components were prepared (all stated % are by weight).

Preparation of a component A

Particulate graft polymer comprising crosslinked poly-n-butyl acrylate (core) and styrene/acrylonitrile copolymer (shell)

A mixture of 98 g of n-butyl acrylate and 2 g of dihydrodicyclopentadienyl acrylate was added to a mixture of 3 g of a polybutyl acrylate seed latex, 100 g of water and 0.2 g of potassium persulfate in the course of 4 hours at 60° C., and a solution of 1 g of sodium $C_{12}$–$C_{18}$-paraffinsulfonate in 50 g of water was added separately therefrom. The polymerization was then continued for a further 3 hours. The average particle diameter $d_{50}$ of the resulting latex was 430 nm, with a narrow distribution of the particle size (Q=0.1).

150 g of this latex were mixed with 60 g of water, 0.03 g of potassium persulfate and 0.05 g of lauroyl peroxide, after which initially 20 g of styrene and then, in the course of a further 4 hours, a mixture of 15 g of styrene and 5 g of acrylonitrile were grafted onto the latex particles in the course of 3 hours at 65° C. Thereafter, the polymer was precipitated with a calcium chloride solution at 95° C., isolated, washed with water and dried in a warm air stream. The degree of grafting of the polymer was 35% and the particles had an average diameter $d_{50}$ of 510 nm.

The graft polymer had the following composition (rounded values):

60% by weight of a graft core comprising crosslinked polybutyl acrylate, 20% by weight of an inner graft comprising styrene polymer and 20% by weight of an outer graft comprising styrene/acrylonitrile copolymer in a weight ratio S/AN of 3:1.

The seed polymer initially used was prepared by the process of EP-B 6503 (column 12, line 55, to column 13, line 22), by polymerization of n-butyl acrylate and tricyclodecenyl acrylate in aqueous emulsion and had a solids content of 40%.

The average particle size stated in the description of component A) is the weight average of the particle sizes.

The average diameter corresponds to the $d_{50}$ value, according to which 50% by weight of all particles have a smaller diameter, and 50% by weight a larger diameter, than the diameter which corresponds to the $d_{50}$ value. In order to characterize the width of the particle size distribution, the $d_{10}$ and the $d_{90}$ value are often stated in addition to the $d_{50}$ value. 10% by weight of all particles are smaller than the $d_{10}$ diameter, and 90% by weight are larger. Similarly, 90% by weight of all particles have a smaller diameter, and 10% by weight have a larger diameter, than that corresponding to the $d_{90}$ value. The quotient $Q=(d_{90}-d_{10})/d_{50}$ is a measure of the width of the particle size distribution. The smaller Q, the narrower is the distribution.

Preparation of a component B

Copolymer of styrene and acrylonitrile

A copolymer of 65% by weight of styrene and 35% by weight of acrylonitrile was prepared by the continuous solution polymerization method, as described in Kunststoff-Handbuch, editors R. Vieweg and G. Daumiller, Vol. V Polystyrol, Carl-Hanser-Verlag Munich 1969, pages 122 to 124. The viscosity number VN (determined according to DIN 53 726 at 25° C., 0.5% strength by weight in dimethylformamide) was 80 ml/g.

Preparation of a component C

Elastomeric block copolymer

A simultaneously heatable and coolable 50 l stainless steel autoclave having a stirrer was prepared by flushing with nitrogen and boiling therein a solution of sec-butyllithium and 1,1-diphenyl-ethylene in cyclohexane and drying. 22.8 l of cyclohexane were introduced, after which 42 ml of sec-butyllithium and 65.8 ml of tetrahydrofuran were added. The individual stages of the polymerization are summarized in Table 1.

In each stage, the duration of the monomer feed was small compared with the duration of the polymerization. The stated initial and final temperatures were obtained by heating or cooling the reactor jacket.

At the end of the reaction (consumption of the monomers), the polymerization was stopped by titration with ethanol until the color disappeared, and the mixture was acidified with a slight excess of acid.

The solution was worked up at 200° C. in a devolatilization extruder which was provided with three devolatilization domes and forward and backward devolatilization. The granules obtained in this manner were used for the preparation of the molding material.

TABLE 1

| Stage | 1 | 2 | 3 | 4 | 5 |
|---|---|---|---|---|---|
| Butadiene feed [g] | — | 1120 | 1120 | 1120 | — |
| Styrene feed [g] | 1008 | 1412 | 1412 | 1412 | 1008 |
| $T_{start}$ [°C.] | 30 | 77 | 73 | 74 | 74 |
| $T_{end}$ [°C.] | 77 | 102 | 95 | 88 | 85 |
| Duration of polymerization [min] | 12 | 14 | 10 | 26 | 14 |

The polymer obtained had the following average molecular weights (in g/mol), as determined by gel permeation chromatography (calibration against polystyrene): number average molecular weight $\overline{M}_n$ 119,000, viscosity average molecular weight $\overline{M}_v$ 158,000, weight average molecular weight $\overline{M}_w$ 176,000.

The glass transition temperatures $T_g$ were determined by DSC and were −16° C. for the soft phase and +75° C. for the hard phase. The width of the glass stage, a measure of the homogeneity of the phase, was 9° C. for the soft phase and 12° C. for the hard phase.

The melt volume index MVI was determined at 200° C. and a load of 5 kg according to DIN 53 735 and was 8.5 ml/10 min.

Preparation of a component D)

Block copolymer of styrene and butadiene having a star-like structure

In a pressure-resistant 6 l reactor which was prepared as described for the preparation of component C), 2.7 kg of cyclohexane and 525 g of styrene were pretitrated with sec-butyllithium and polymerized with 0.33 g of sec-butyllithium for 30 minutes under an inert gas atmosphere and in the absence of moisture. The temperature at the beginning was 54° C. 0.22 kg of cyclohexane, 0.9 g of sec-butyllithium and 225 g of styrene were added to the active reaction solution at 71° C., and polymerization was carried out for one hour, after which 10 g of tetrahydrofuran and 250 g of butadiene were polymerized on in the course of one hour at about 74° C. Finally, coupling was effected with 10 ml of epoxidized linseed oil (Epoxyl 9-5) in 150 ml of toluene. The viscosity number was 91.9 cm³/g.

The solution was worked up as described for component C).

Novel materials and their properties

Mixtures were prepared from components A, B, C and D and were processed at 200° C. on a roll mill to give 1 mm thick films.

The following properties of the films were determined:
Tensile strength: the tensile test was carried out according to DIN 53 504 on strips which were punched out of the film.
Elongation at break: the elongation on application of the tearing force was determined according to DIN 53 504 in the tensile test and was stated as a % of the original dimension of the strip.
Tear propagation strength: a tear propagation test according to DIN 43 515 was carried out on strips which had been punched out.
Shore hardness: the Shore hardness was determined according to DIN 43 505 using tester D.
Heat distortion resistance: this was determined according to DIN 53 460 as the Vicat number by measuring method A.

The compositions of the films produced and the test results are listed in Table 2.

TABLE 2

| Experiment No. | 1 | 2 | 3*) | 4*) |
|---|---|---|---|---|
| Composition [% by weight]: | | | | |
| Component A | 80 | 70 | 80 | — |
| Component B | 10 | 10 | — | — |
| Component C | 7.2 | 14.4 | 14.4 | 72 |
| Component D | 2.8 | 5.6 | 5.6 | 28 |
| Properties: | | | | |
| Tensile strength [N/mm²] | 15.7 | 17.0 | 17.0 | 28.8 |
| Elongation at break [%] | 154 | 169 | 255 | 645 |
| Tear propagation strength [N/mm²] | 46.6 | 43.6 | 34.2 | 49.6 |
| Shore D hardness | 46 | 45 | 41 | 29 |
| Heat distortion resistance: Vicat A [°C.] | 86 | 79 | 68 | **) |

*)for comparison
**)test impossible since test specimen was too soft

Films obtained from molding materials which do not contain component B (styrene-acrylonitrile copolymer) have a high elongation at break (Comparative Experiment No. 3*).

However, the tear propagation strength of such films is substantially smaller than in the case of films comprising the novel molding materials (Experiments No. 1 and 2).

Films whose molding materials contain no component A) (graft polymer, SAN on polybutyl acrylate rubber) and no component B) (Comparative Experiment No. 4*) have a considerably lower hardness (Shore D) than the films of novel composition and, owing to their softness, are difficult to process.

We claim:

1. A thermoplastic molding material comprising
A) from 30 to 98% by weight of a graft polymer of
 $a_c$) from 30 to 90% by weight of an elastomeric graft core obtained by copolymerizing
  $a_c/1$) from 80 to 99.99% by weight of one or more $C_1$-$C_{10}$-alkyl esters of acrylic acid,
  $a_c/2$) from 0.01 to 20% by weight of a crosslinking monomer, and
  $a_c/3$) from 0 to 19.99% by weight of one or more further monomers, and
 $a_s$) from 10 to 70% by weight of a graft shell of
  $a_s/1$) from 50 to 100% by weight of a styrene compound of the formula

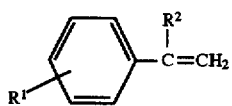

where $R^1$ and $R^2$ are each hydrogen or $C_1$-$C_8$-alkyl, or a $C_1$-$C_8$-alkyl ester of acrylic acid or methacrylic acid, or mixtures of the styrene compound and the $C_1$-$C_8$-alkyl ester of acrylic acid or methacrylic acid, and $a_s/2$) from 0 to 50% by weight of one or more further monomers, B) from 1 to 50% by weight of a thermoplastic polymer of
  $b_1$) from 50 to 100% by weight of styrene or α-methylstyrene, or mixtures thereof
  $b_2$) from 0 to 50% by weight of acrylonitrile, and
  $b_3$) from 0 to 50% by weight of one or more further monomers, C) from 1 to 70% by weight of an elastomeric block copolymer of at least one block A which has polymerized units of a vinylaromatic monomer and forms a hard phase or of a block B which has diene monomers and forms a first elastomeric (soft) phase or of a block A and a block B and at least one elastomeric block B/A which has polymerized units of both a vinylaromatic monomer and a diene and forms a soft phase (if required a second or further soft phase), the glass transition temperature $T_g$ of block A being above 25° C. and that of block B/A being below 25° C. and the phase volume ratio of block A to block B/A being chosen so that the proportion of the hard phase in the total block copolymer is 1–40% by volume and the amount of the diene is less than 50% by weight, and D) from 0 to 30% by weight of a polymer having a star-like structure, obtained by linking a plurality of block copolymer chains comprising
  $d_1$) from 30 to 90% by weight of styrene or α-methylstyrene or mixtures thereof, and
  $d_2$) from 10 to 70% by weight of butadiene or isoprene or mixtures thereof
via polyfunctional molecules.

2. A thermoplastic molding material as defined in claim 1, in which, in block copolymer C) the $T_g$ of the hard phase is above 50° C. and the $T_g$ of the soft phases is below 5° C.

3. A thermoplastic molding material as defined in claim 1, in which, in block copolymer C), the vinylaromatic monomer is selected from styrene, α-methylstyrene and vinyltoluene and the diene is selected from butadiene and isoprene.

4. A thermoplastic molding material as defined in claim 1, in which, in block copolymer C), the soft phase (or if required a second or further soft phase) is formed from a copolymer of a vinylaromatic with a diene.

5. A thermoplastic molding material as defined in claim 2, in which component B is a copolymer of from 75 to 95% by weight of styrene and from 5 to 25% by weight of acrylonitrile.

6. A thermoplastic molding material as defined in claim 1, containing, in addition to components A) to D), from 0.5 to 10% by weight of a copolymer having an average molecular weight of from 2000 to 8000 and comprising from 30 to 70% by weight of ethylene oxide and from 70 to 30% by weight of 1,2-propylene oxide.

7. A film or molding formed from a thermoplastic molding material as defined in claim 1.

8. A process for finishing the interior of an automobile, wherein films and moldings are produced from the thermoplastic molding materials as defined in claim 1 and the films and moldings are fitted in the automobile interior.

* * * * *

UNITED STATES PATENT AND TRADEMARK OFFICE
CERTIFICATE OF CORRECTION

PATENT NO.: 5,760,134

DATED: June 2, 1998

INVENTOR(S): GUENTHERBERG et al.

It is certified that error appears in the above-identified patent and that said Letters Patent is hereby corrected as shown below:

On the cover page, insert the following priority information:

-- [30]  Foreign Application Priority Data
  Oct. 2, 1995  [DE]  Germany ............ 195 36 813.4--.

Col. 14, claim 8, line 3, delete "as".

Signed and Sealed this

Thirteenth Day of October 1998

*Attest:*

BRUCE LEHMAN

*Attesting Officer*   *Commissioner of Patents and Trademarks*